US009525551B1

(12) United States Patent
Ackerman et al.

(10) Patent No.: US 9,525,551 B1
(45) Date of Patent: Dec. 20, 2016

(54) RANDOMLY SKEWING SECRET VALUES AS A COUNTERMEASURE TO COMPROMISE

(75) Inventors: Karl Ackerman, Topsfield, MA (US); Marten Erik van Dijk, Somerville, MA (US); Ari Juels, Brookline, MA (US); Emily Shen, Thousand Oaks, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 400 days.

(21) Appl. No.: 13/248,127

(22) Filed: Sep. 29, 2011

(51) Int. Cl.
H04L 9/32 (2006.01)
G06F 21/31 (2013.01)
G06F 21/34 (2013.01)

(52) U.S. Cl.
CPC ............. *H04L 9/3228* (2013.01); *G06F 21/31* (2013.01); *G06F 21/34* (2013.01)

(58) Field of Classification Search
None
See application file for complete search history.

(56) References Cited

U.S. PATENT DOCUMENTS

| 4,720,860 | A | 1/1988 | Weiss |
| 5,168,520 | A | 12/1992 | Weiss |
| 5,361,062 | A | 11/1994 | Weiss et al. |
| 6,240,184 | B1 * | 5/2001 | Huynh .................... G06F 21/31 380/206 |
| 6,327,661 | B1 * | 12/2001 | Kocher et al. ............... 713/193 |
| 7,363,494 | B2 * | 4/2008 | Brainard et al. ............. 713/168 |
| 7,973,607 | B1 * | 7/2011 | Ciaffi et al. .................... 331/16 |
| 8,325,913 | B2 * | 12/2012 | Ciet et al. ....................... 380/28 |
| 2005/0166263 | A1 * | 7/2005 | Nanopoulos ............ G06F 21/31 726/7 |
| 2007/0130472 | A1 * | 6/2007 | Buer ................... H04L 63/0428 713/182 |
| 2007/0133591 | A1 * | 6/2007 | Shatford ....................... 370/457 |
| 2007/0174614 | A1 * | 7/2007 | Duane et al. ................. 713/168 |
| 2007/0211867 | A1 * | 9/2007 | Polk et al. ....................... 379/45 |
| 2007/0220595 | A1 * | 9/2007 | M'raihi et al. ................... 726/5 |
| 2007/0239606 | A1 * | 10/2007 | Eisen .............................. 705/51 |
| 2008/0040274 | A1 * | 2/2008 | Uzo ................................ 705/44 |

(Continued)

OTHER PUBLICATIONS

U.S. Appl. No. 12/895,130, filed in the name of Daniel V. Bailey et al. on Sep. 30, 2010 and entitled "Agile OTP Generation.".

Primary Examiner — Farid Homayounmehr
Assistant Examiner — Henry Tsang
(74) Attorney, Agent, or Firm — Ryan, Mason & Lewis, LLP

(57) ABSTRACT

A first cryptographic device is authenticated by a second cryptographic device. The second cryptographic device stores an alternative version of a secret value associated with the first cryptographic device as a countermeasure to compromise of the secret value. In conjunction with a protocol carried out between the first cryptographic device and the second cryptographic device, the second cryptographic device determines the secret value based at least in part on the alternative version of the secret value, and utilizes the determined secret value to authenticate the first cryptographic device. The alternative version of the secret value may comprise a randomly-skewed version of the secret value. For example, the secret value may comprise a key or other parameter of the first cryptographic device and the alternative version of the secret value may comprise a randomly-skewed version of the key or other parameter.

22 Claims, 2 Drawing Sheets

P = AUTHENTICATION PROTOCOL

(56) References Cited

U.S. PATENT DOCUMENTS

2009/0265275 A1* 10/2009 Everhart .......................... 705/44
2010/0134257 A1*  6/2010 Puleston et al. ............. 340/10.4
2011/0258452 A1* 10/2011 Coulier et al. ................ 713/171
2012/0155647 A1*  6/2012 Zhang et al. ................. 380/279
2012/0233675 A1*  9/2012 Hird ................................. 726/6

* cited by examiner

P = AUTHENTICATION PROTOCOL

RANDOMLY SKEWING SECRET VALUES AS A COUNTERMEASURE TO COMPROMISE

FIELD OF THE INVENTION

The present invention relates generally to the field of cryptography, and more particularly to authentication techniques implemented using cryptographic devices such as an authentication token and an authentication server.

BACKGROUND OF THE INVENTION

Cryptographic devices include, by way of example, one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passcodes are wirelessly communicated to a computer or other element of an authentication system. These wired or wireless arrangements, also referred to herein as connected tokens, save the user the trouble of reading the passcode from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Authentication tokens and other OTP devices are typically programmed with a random seed or other type of key that is also stored in a token record file. The record file is loaded into an authentication server, such that the server can create matching passcodes for the authentication token based on the key and the current time or current event count. When the user first activates the token, the server stores the user PIN in association with the key corresponding to that token.

An adversary possessing a stolen record file is able to generate correct passcodes for each token key stored in that file. In order to impersonate a particular user, the adversary would generally have to "phish" or otherwise obtain access to the details of at least one user login session such that it learns the user PIN as well as one passcode that can be matched to one of the token keys in the record file.

Security issues such as these can be addressed through the use of unidirectional or broadcast key updates. In this manner, the key associated with a particular authentication token is periodically refreshed or otherwise updated. However, conventional key update techniques are deficient in that the updates themselves can be compromised without the token user or the associated authentication server being aware of the compromise.

SUMMARY OF THE INVENTION

One or more illustrative embodiments of the present invention provide authentication techniques in which a random skew is introduced between secret values utilized by first and second cryptographic devices as a countermeasure to compromise of one or more of those values. By way of example, the secret values may comprise keys or other parameters associated with the first and second cryptographic devices.

In one aspect, a first cryptographic device is authenticated by a second cryptographic device. The second cryptographic device stores an alternative version of a secret value associated with the first cryptographic device as a countermeasure to compromise of the secret value. In conjunction with a protocol carried out between the first cryptographic device and the second cryptographic device, the second cryptographic device determines the secret value based at least in part on the alternative version of the secret value, and utilizes the determined secret value to authenticate the first cryptographic device.

By way of example, the second cryptographic device may store the actual secret value after having determined it in conjunction with the protocol carried out with the first cryptographic device. This means that in future protocol interactions the actual secret value can be used by the second cryptographic device in authenticating the first cryptographic device. However, a record file may still store only the alternative version of the secret value, such that an adversary that steals the record file will obtain only the alternative version of the secret value and not the secret value itself. The adversary will therefore have to phish or otherwise obtain additional information from multiple login sessions in order to impersonate the first cryptographic device.

The alternative version of the secret value may comprise, for example, a randomly-skewed version of the secret value. More particularly, the secret value may comprise a key or other parameter of the first cryptographic device and the alternative version of the secret value may comprise a randomly-skewed version of the key or other parameter. The other parameters subject to random skewing may comprise a passcode length and a serial number of the first cryptographic device.

As another example, the secret value may comprise a randomly-skewed key or other randomized parameter of the first cryptographic device, and the alternative version of the secret value may comprise information characterizing a range of values from which the randomized parameter was selected. Such randomized parameters may comprise one or more of a clock drift vector and an initialization time of the first cryptographic device.

In at least one of the above-noted illustrative embodiments, the first cryptographic device comprises an authentication token and the second cryptographic device comprises an authentication server.

The illustrative embodiments advantageously overcome the drawbacks of conventional techniques, by providing authentication techniques that significantly reduce the vulnerability of keys or other secret values to compromise by an adversary when such values are stored in a record file or other similar database of an authentication server.

These and other features and advantages of the present invention will become more readily apparent from the accompanying drawings and the following detailed description.

DETAILED DESCRIPTION

The present invention will be described herein with reference to exemplary cryptographic devices and associated authentication systems. It is to be appreciated, however, that the invention is not restricted to use with the particular illustrative device and system configurations shown.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can provide or process randomly-skewed keys or other secret values in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides authentication techniques in which a controlled but random skew is introduced between secret values associated with first and second cryptographic devices as a countermeasure to compromise of one or more of those values.

Figure 1:
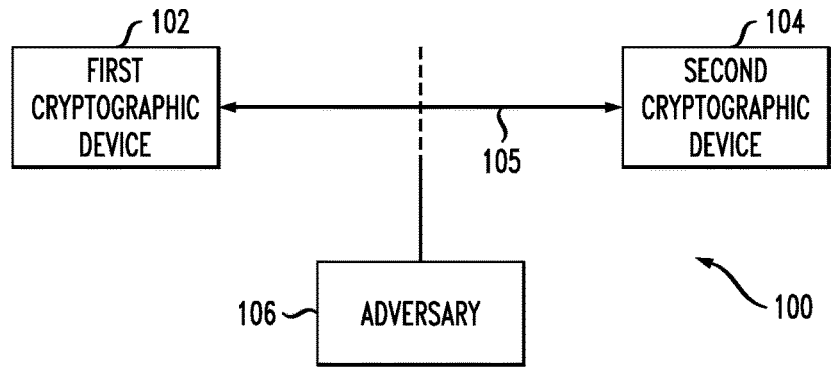
FIG. 1 is a simplified block diagram of an authentication system in an illustrative embodiment of the invention.

FIG. 1 shows a simplified view of an authentication system 100 in an illustrative embodiment of the invention. In the system 100, first and second cryptographic devices 102 and 104 communicate with one another over a channel 105. An adversary 106 initiates security attacks in the system 100 at least in part by accessing channel 105.

In the system 100, the first cryptographic device 102 authenticates itself to the second cryptographic device 104 using a secret value associated with the first cryptographic device 102. The secret value may comprise a seed or other key stored in the first cryptographic device 102. Instead of initially storing that secret value itself, the second cryptographic device 104 initially stores an alternative version of the secret value associated with the first cryptographic device 102 as a countermeasure to compromise of the secret value.

In conjunction with a protocol carried out between the first cryptographic device 102 and the second cryptographic device 104, the second cryptographic device 104 determines the secret value based at least in part on the alternative version of the secret value, and utilizes the determined secret value to authenticate the first cryptographic device.

The second cryptographic device 104 may store the actual secret value after having determined it in conjunction with the protocol carried out with the first cryptographic device 102. As a result, in future protocol interactions the actual secret value can be used by the second cryptographic device in authenticating the first cryptographic device. However, a record file associated with the second cryptographic device may still store only the alternative version of the secret value, such that an adversary that steals the record file will obtain only the alternative version of the secret value and not the secret value itself. The adversary will therefore have to phish or otherwise obtain additional information from multiple login sessions in order to impersonate the first cryptographic device.

The alternative version of the secret value in an illustrative embodiment may comprise a randomly-skewed version of the secret value. More particularly, the secret value may comprise a seed or other key of the first cryptographic device 102 and the alternative version of the secret value may comprise a randomly-skewed version of that seed or other key.

In other embodiments, the secret value may comprise a passcode length in digits of the first cryptographic device 102 and the alternative version of the secret value may comprise a randomly-skewed version of the passcode length in digits.

In still further embodiments, the secret value may comprise a serial number of the first cryptographic device 102 and the alternative version of the secret value may comprise a randomly-skewed version of the serial number.

In yet other embodiments, the secret value may comprise a randomized parameter of the first cryptographic device 102 and the alternative version of the secret value may comprise information characterizing a range of values from which the randomized parameter was selected. More particularly, the randomized parameter may comprise at least one of a randomized key, a randomized clock drift vector, and a randomized initialization time of the first cryptographic device 102.

Each of the above-noted illustrative embodiments will be described in greater detail below.

In one or more of these illustrative embodiments, the first cryptographic device 102 and the second cryptographic device 104 may comprise an authentication token and an authentication server, respectively.

Figure 2:
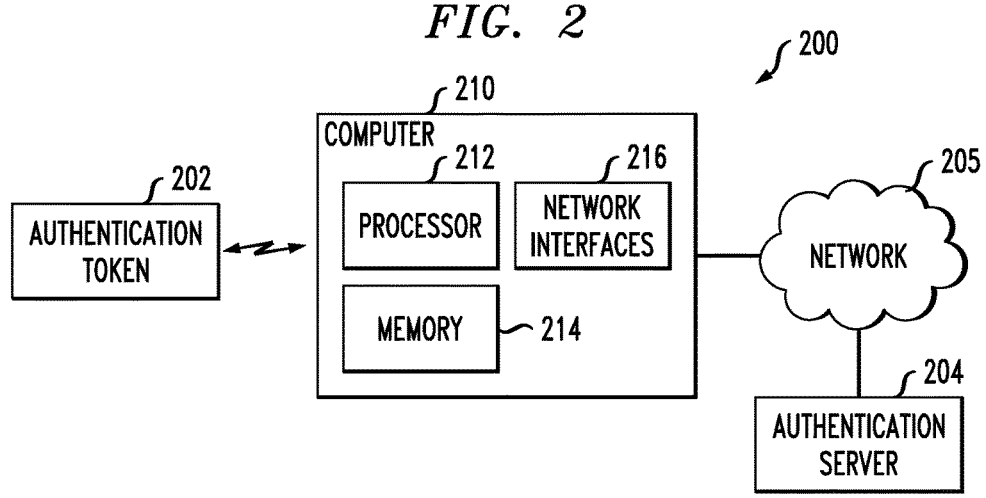
FIG. 2 is a more detailed block diagram of an authentication system comprising multiple cryptographic devices in an illustrative embodiment of the invention.

FIG. 2 shows an example of an authentication system 200 corresponding generally to an implementation of system 100 in which first cryptographic device 102 comprises an authentication token 202 and second cryptographic device 104 comprises an authentication server 204. Information from the authentication token 202 is sent to the authentication server 204 via network 205 and a host device 210 that illustratively comprises a computer. As indicated previously, the term "cryptographic device" as used herein is intended to be broadly construed so as to encompass, for example, authentication token 202 alone or in combination with at least a portion of the computer 210. In other embodiments, such as those involving use of software tokens, the first cryptographic device 102 may comprise only computer 210, or another type of processing device, such as a mobile telephone.

The authentication token 202 is configured to generate OTPs or other passcodes using the techniques disclosed herein. Such passcodes may be presented to a user via a display of the token, such that the user can manually enter a given passcodes into a user interface of the host device 210. Alternatively, a given passcode may be communicated directly from the authentication token 202 via a wired or wireless connection between the token and the host device 210. By way of example, the authentication token may be configured to communicate with the host device 210 via a wired connection such as a USB interface, or via a wireless connection such as a Bluetooth or IEEE 802.11 connection.

The authentication token 202 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

The host device 210 may comprise a desktop or portable personal computer, mobile telephone, personal digital assistant (PDA), wireless email device, workstation, kiosk, television set-top box, game console, or any other information processing device that provides an interface between authentication token 202 and authentication server 204.

As shown in the figure, the host device 210 generally comprises a processor 212, a memory 214, and one or more network interfaces 216 which allow the device to communicate with the authentication server 204 over the network 205.

It should also be noted that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

The network 205 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

In the system 200, the authentication server 204 is configured as a back-end authentication server, in that it communicates with host device 210 over a network, but other types of authentication servers may be used.

A wide variety of authentication processes may be implemented using an authentication token 202, authentication server 204 and host device 210 arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of authentication token 202, authentication server 204 and host device 210, and possibly other system components, although only single instances of such components are shown in the simplified system diagram of FIG. 2 for clarity of illustration. Also, as indicated previously, other embodiments may combine certain system elements, such as the authentication token and the host device. It is also possible to eliminate, modify or replace other system elements. For example, authentication token 202 may communicate directly with authentication server 204, rather than via other elements such as host device 210 and network 205.

Figure 3:
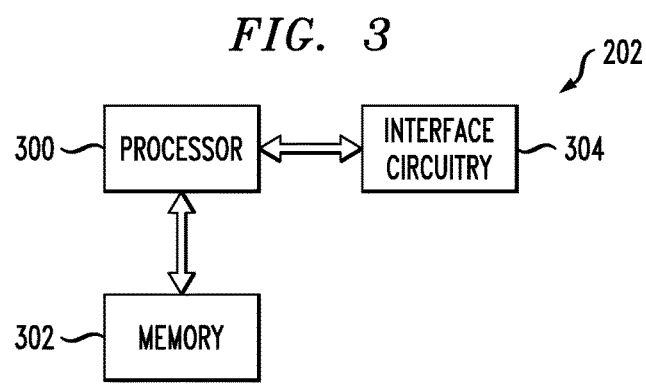
FIG. 3 illustrates portions of one of the cryptographic devices of the authentication system of FIG. 2.

Referring now to FIG. 3, portions of a given cryptographic device of the system 200 are shown. The cryptographic device is illustratively shown in FIG. 3 as representing authentication token 202, but similar elements may also be present in the authentication server 204. These devices may also include other types of elements commonly found in conventional implementations of such devices.

In this embodiment, the authentication token 202 comprises a processor 300 coupled to a memory 302. Accordingly, at least a portion of an authentication process as disclosed herein may be implemented in the form of software that is executed on a cryptographic device comprising a processor coupled to a memory. Processor 300 is also coupled to interface circuitry 304. The interface circuitry 304 may comprise, for example, circuitry for interfacing the authentication token 202 to the host device 210 via a wired or wireless connection in the case of a connected token, or circuitry for generating a visual or audible presentation of a given generated password in the case of a disconnected token. Thus, the interface circuitry may include, for example, wired or wireless interface circuitry such as USB, Bluetooth or 802.11 circuitry, or one or more speakers, displays and associated drivers, in any combination.

The various elements 300, 302 and 304 of FIG. 3 may be implemented in whole or in part as a conventional microprocessor, microcontroller, digital signal processor, application-specific integrated circuit (ASIC) or other type of circuitry, as well as portions or combinations of such circuitry elements. As indicated previously, portions of an authentication process in accordance with a given illustrative embodiment of the invention can be implemented at least in part in the form of one or more software programs that are stored at least in part in the memory 302 and executed by processor 300. Memory 302 may also be used for storing information used to perform passcode generation or other operations associated with authentication in the authentication system 200.

Techniques for authentication utilizing randomly-skewed secret values in systems 100 or 200 will now be described in greater detail, with reference to FIGS. 4 and 5.

Figure 4:
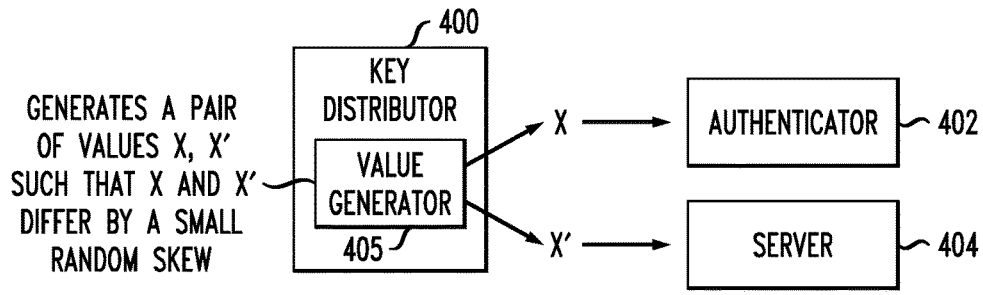
FIG. 4 shows the generation and distribution of secret values to an authenticator and a server of an authentication system such as that of FIG. 1 or 2 in an illustrative embodiment.

In the embodiment shown in FIG. 4, a key distributor 400 communicates with an authenticator 402 and a server 404. The authenticator 402 and server 404 may correspond to the respective authentication token 202 and authentication server 204 of FIG. 2, or more generally to the respective first and second cryptographic devices 102 and 104 of FIG. 1. Although shown as a separate element in FIG. 4, the key distributor 400 may be implemented at least in part within a given one of the devices 402 or 404, or in a separate cryptographic device of one of the systems 100 or 200.

The key distributor 400 comprises a value generator 405 that generates a pair of secret values X and X' such that X and X' differ by a small random skew. The authenticator 402 stores the secret value X. However, the server 404 does not store the secret value X, but instead stores the randomly-skewed version of X, that is, the secret value X'. The randomly-skewed value X' is an example of what is more generally referred to herein as an "alternative version" of the secret value X stored by the authenticator 402.

In this embodiment, it is assumed that the server 404 authenticates the authenticator 402 using an authentication protocol P. As noted above, the server does not initially store the secret value X but instead stores the corresponding randomly-skewed value X'. More particularly, the value X' may be part of an otherwise conventional token record file associated with the server, such that the server initially stores X' as provided by the token record file. Once the secret value X is estimated or otherwise determined by the server, as will be described below, that value may be stored by the server for future use, even though the record file will continue to store the randomly-skewed value X' and not the secret value X. This provides significant security advantages in the authentication system, in that a record file of the server 404 does not include the secret value X. Thus, even if the record file of the server 404 is compromised, thereby revealing the randomly-skewed secret value X' to an adversary, the secret value X itself is not compromised.

The key distributor 400 initializes the authenticator 402 and the server 404 with the pair of secret values X and X' such that X and X' differ by a small randomly-generated skew value S that is initially unknown to the server 404. The skew value S is also referred to herein as a "white lie."

The server 404 executes the authentication protocol P with the authenticator 402 at least once. The server 404 is then able to compute the skew value S and thus the secret value X using its transcripts of the execution of P. The server 404 uses its resulting knowledge of X, once acquired, to validate further transactions with the authenticator 402. The objective of this arrangement is to prevent access to the system by an adversary that that gains access to the randomly-skewed value X'.

Figure 5:
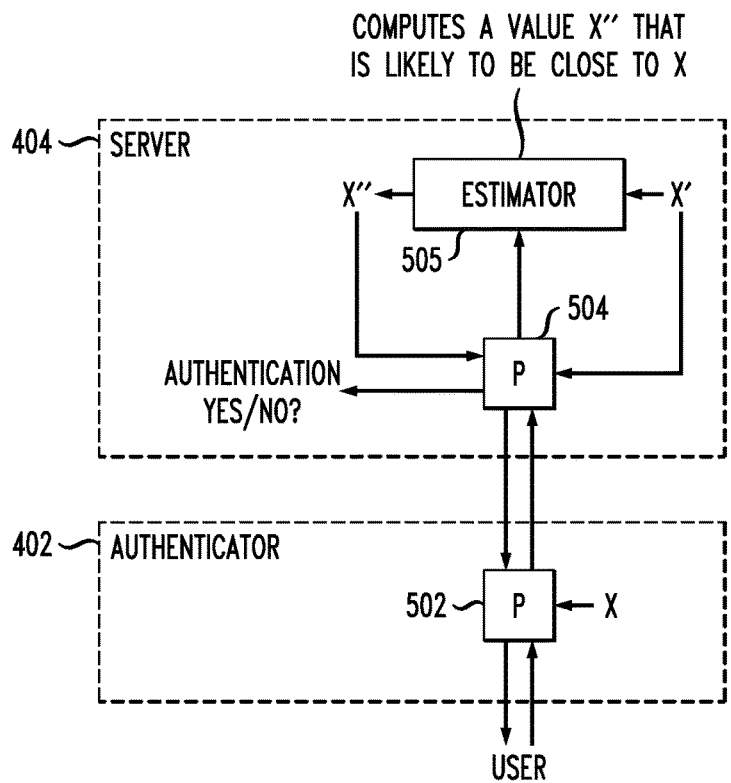
FIG. 5 illustrates an exemplary authentication process carried out using the secret values generated and distributed in FIG. 4.

FIG. 5 shows one example of an authentication process that may be carried out between the authenticator 402 and server 404 as initialized with the respective secret value X and corresponding randomly-skewed secret value X'. In this example, the authenticator 402 and server 404 include respective authenticator and server portions 502 and 504 of the authentication protocol P. The authenticator 402 executes its portion of the authentication protocol P using the secret value X. The server 404 executes its portion of the authentication protocol P using the randomly-skewed secret value X'.

The server 404 in this embodiment further comprises an estimator 505 that computes a value X" that is likely to be close to the secret value X. The server stores the estimate X" for use in future protocol interactions with the authenticator 402. The server 404 therefore generates the estimate X" of the secret value X, and uses that value along with the value X' in carrying out its portion of the protocol P. The computation of the estimate X" of the secret value estimate X may be viewed as an example of what is more generally referred to herein as determining the secret value X, although in this case within a particular acceptable margin of error. The computation of the estimate X" may also be viewed as the server learning the random skew value S that was used in value generator 405 to generate X' from X. The server 404 uses the computed estimate X" of the secret value X to generate a Yes or No authentication decision as indicated in the figure.

In one possible alternative implementation of the above-described embodiment, the server 404 may learn the random skew value S by executing the protocol P with the authenticator 402 under multiple, secret values X1, X2, . . . XN.

Also, the authenticator 402 may be reinitialized periodically or upon occurrence of specified events. For each such reinitialization, the authenticator 402 may refresh its secret value, and the server 404 can determine the secret value in the manner described above.

It was mentioned previously that an adversary possessing a stolen record file is able to generate correct passcodes for each token key stored in that file. In order to impersonate a particular user under conventional practice, the adversary would generally have to "phish" or otherwise obtain access to the details of at least one user login session such that it learns the user PIN as well as one passcode that can be matched to one of the token keys in the record file. An arrangement of the type described above would in effect require an adversary in possession of a stolen record file to phish multiple passcodes from a given authentication token in order to successfully impersonate the corresponding user. More particularly, the adversary will need to phish multiple passcodes of the given authentication token in order to resolve its uncertainty about the white lie S. For example, if S contains 20 bits uncertainty, then at least two passcodes each containing 10 bits of information about S would need to be phished. Thus, using the techniques of the above embodiment, a stolen record file can only be used to guess correct passcodes with small probability, such as $\frac{1}{1000}$, unless the adversary is able to obtain multiple passcodes for the same token.

In embodiments in which the authenticator 402 comprises an authentication token, the secret value X may comprise one or more of a key, a passcode length and a serial number of the authentication token, and the randomly-skewed value X' may comprise one or more of a corresponding randomly-skewed key, randomly-skewed version of the passcode length, and randomly-skewed version of the serial number.

The term "key" as used herein is intended to be broadly construed so as to encompass a seed of the authentication token. If the randomly-skewed value X' is a randomly-skewed seed of the authentication token, it may be stored in the record file of the server 404 in place of the corresponding actual seed X.

As an example of randomized passcode length, the authentication token may ordinarily generate passcodes of length X=8 while the record file of the server 404 stores the passcode length as X'=6. After an iteration of the authentication protocol P, the server learns the actual passcode length X=8. An adversary will need to phish at least one login session in order to determine the correct passcode length. If the adversary does not know the PIN length, it may need to phish two login sessions.

As an example of randomized serial number, the record file of the server 404 may store authentication token serial numbers in randomized form. This may be achieved by randomizing the last k bits of the serial numbers stored in the record file. Upon token activation, the user sends the server the token serial number along with the PIN and current passcode. The server thereby learns the correct serial number. If the server later suspects that an adversary has breached the system, the server can request the serial number from the user as a special query. As long as the adversary did not phish the initial login session that contained the serial number, the adversary will not be able to correctly guess the serial number except with very small probability. Note that phishing ordinary login sessions gives the adversary no information about the serial number.

Various combinations of keys, digit lengths, serial numbers or other parameters of the authentication token may be randomized in other embodiments.

An advantage of the embodiments in which the randomly-skewed value X' comprises one or more of a randomly-skewed key, a passcode length and a serial number is that no changes are required to the authentication token itself.

In other embodiments, a parameter of the authenticator 402 may be randomized to provide the secret value X, and the alternative version X' of the secret value may comprise information characterizing a range of values from which the randomized parameter was selected. In such embodiments, the authenticator itself is modified to randomize the parameter. This parameter may comprise a seed or other key of an authentication token.

If the authenticator is assumed to be a time-synchronous authentication token, the secret value X may comprise one or more of a randomized clock drift vector and a randomized initialization time of the authentication token. The initialization time may refer to, for example, a "birthdate" of the time-synchronous token, or equivalently an offset of the token birthdate from a specified standard reference time, such as Greenwich Mean Time (GMT). The clock drift vector of the token generally indicates variation in the token clock rate as a function of time. The initialization time and the clock drift vector may both be randomly-skewed in a given such embodiment.

As one illustration, the clock drift vector may be randomized in the time-synchronous authentication token by selection of the clock drift vector from a range between a minimum clock drift vector and a maximum clock drift vector. The alternative version of the secret value comprising the randomized clock drift vector may then comprise information specifying the minimum clock drift vector and the maximum clock drift vector. The server 404 determines the randomized clock drift vector by matching a presented passcode to a list of potential passcodes within a time window determined as a function of the minimum and maximum clock drift vectors.

The randomized clock drift vector may be implemented during manufacture of the authentication token. Conventional tokens may include a capability for correcting for crystal oscillator variation over time in order to minimize clock drift. This capability may be modified to support the use of a randomized clock drift vector. A token that is configured with a randomized clock drift vector will drift away from the current time starting at the initialization time of the token. An exemplary range of clock drift vector values subject to random selection may be on the order of +/−300 seconds per day.

On an initial use of the token for authentication, the server 404 will attempt to match the presented passcode with a finite list of potential passcodes. The list of passcodes to search for a potential match is determined by calculating the minimum and maximum time vector per minute times the number of minutes from the token initialization time or "birthdate." If the server is able to match the presented passcode with one of the candidates it can determine the clock drift vector and store this for future lookup.

It may be possible for a false positive to be generated and to correct for this the server 404 can request that the next passcode be presented.

As a result of programming the authentication token with a randomly-selected clock drift vector, the adversary will need to phish or otherwise obtain information associated with multiple login sessions in order to successfully impersonate the user.

Similarly, the initialization time may be randomized by selection of the initialization time from a range between a minimum initialization time and a maximum initialization time. The alternative version of the secret value comprising the randomized initialization time may then comprise information specifying the minimum initialization time and the maximum initialization time.

As noted above, both the clock drift vector and the initialization time may be randomized in a given embodiment. However, determining the skew values associated with skewing of both the clock drift vector and the initialization time in the server 404 would generally require at least two login sessions in order to obtain two interpolation points of a linear function given generally as follows:

$$S_{IT}+t \cdot (S_{CD})$$

where $S_{IT}$ denotes the random skew associated with the initialization time, $S_{CD}$ denotes the random skew associated with the clock drift vector, and t denotes the current time. The above equation illustrates that multiple login sessions will generally be necessary in order for the server 404 to slowly determine the random skews that were applied in the time-synchronous authentication token. However, an adversary would also need to phish or otherwise obtain information from multiple login sessions, thereby significantly enhancing the security of the system relative to conventional arrangements.

Instead of randomizing the clock drift vector and the initialization time of the authentication token as in the immediately preceding examples, a randomized version of a seed or other key can be stored in the token. In this case, the secret value is the randomized version of the key, and the alternative version of the secret value may be the key itself. The server then determines the secret value by attempting to match passcodes within a specified random skew of the actual key. As another possible variant, both the token and the server may store randomized versions of the seed or other key.

In arrangements involving random skewing of clock drift, initialization time, keys or other parameters of the authenticator 402, the secret value X may be viewed as comprising a randomized parameter of the authenticator and the alternative version X' of the secret value may comprise information characterizing a range of values from which the randomized parameter was selected.

As noted above, the random skewing of secret values in an authentication system as described herein can significantly increase the security of the system relative to adversaries that attempt to compromise secret values stored in a record file or similar database of an authentication server.

It should again be emphasized that the above-described embodiments of the invention are presented for purposes of illustration only. Many variations and other alternative embodiments may be used. For example, although described primarily in the context of hardware authentication tokens, the techniques are applicable to a wide variety of other types of cryptographic devices that can benefit from enhanced security for shared keys or other secret values, including software authentication tokens, wireless sensors, RFID tags, etc. Also, the particular configuration of system and device elements shown in FIGS. 1-4, and the authentication process of FIG. 5, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method of authenticating a first cryptographic device by second cryptographic device, the method comprising the steps of:
   storing in the second cryptographic device an alternative version of a secret value associated with the first cryptographic device in place of the secret value itself as a countermeasure to compromise of the secret value;
   in conjunction with a protocol carried out between the first cryptographic device and the second cryptographic device, determining in the second cryptographic device the secret value based at least in part on the alternative version of the secret value; and
   authenticating the first cryptographic device utilizing the determined secret value in the second cryptographic device;
   wherein the first cryptographic device comprises a time-synchronous authentication token and the second cryptographic device comprises an authentication server;
   wherein the secret value comprises a randomized clock drift vector of the time-synchronous authentication token;
   wherein the randomized clock drift vector is randomized by selection of said clock drift vector from a range between a minimum clock drift vector and a maximum clock drift vector; and wherein the alternative version of the secret value comprising the randomized clock drift vector comprises information specifying the minimum clock drift vector and the maximum clock drift vector.

2. The method of claim 1 wherein the alternative version of the secret value comprises a randomly-skewed version of the secret value.

3. The method of claim 2 wherein the secret value comprises a key of the first cryptographic device and the alternative version of the secret value comprises a randomly-skewed version of the key.

4. The method of claim 2 wherein the secret value comprises a passcode length in digits and the alternative version of the secret value comprises a randomly-skewed version of the passcode length in digits.

5. The method of claim 2 wherein the secret value comprises a serial number of the first cryptographic device and the alternative version of the secret value comprises a randomly-skewed version of the serial number.

6. The method of claim 1 wherein the secret value comprises a randomized parameter of the first cryptographic device and the alternative version of the secret value comprises information characterizing a range of values from which said randomized parameter was selected.

7. The method of claim 6 wherein the randomized parameter of the first cryptographic device comprises a randomized key of the first cryptographic device.

8. The method of claim 1 wherein the step of determining the secret value comprises determining the randomized clock drift vector by matching a presented passcode to a list of potential passcodes within a time window determined as a function of the minimum and maximum clock drift vectors.

9. The method of claim 1 wherein the secret value comprises a randomized initialization time of the time-synchronous authentication token.

10. The method of claim 1 wherein storing the alternative version of the secret value rather than the secret value itself as a countermeasure to compromise of the secret value comprises storing the alternate version of the secret value in a record file of the second cryptographic device rather than the secret value itself.

11. The method of claim 10 wherein the record file continues to store the alternative version of the secret value rather than the secret value itself even after the secret value is determined in conjunction with the protocol.

12. A method of authenticating a first cryptographic device by second cryptographic device, the method comprising the steps of:
   storing in the second cryptographic device an alternative version of a secret value associated with the first cryptographic device in place of the secret value itself as a countermeasure to compromise of the secret value;
   in conjunction with a protocol carried out between the first cryptographic device and the second cryptographic device, determining in the second cryptographic device the secret value based at least in part on the alternative version of the secret value; and
   authenticating the first cryptographic device utilizing the determined secret value in the second cryptographic device;
   wherein the first cryptographic device comprises a time-synchronous authentication token and the second cryptographic device comprises an authentication server; and
   wherein the secret value comprises both a randomized initialization time and a randomized clock drift vector of the time-synchronous authentication token, and wherein the authentication server determines corresponding random skew values for the randomized initialization time and the randomized clock drift vector by obtaining at least two interpolation points of a linear function given generally as follows:

$$S_{IT} + t \cdot (S_{CD})$$

where $S_{IT}$ denotes the random skew value associated with the randomized initialization time, $S_{CD}$ denotes the random skew value associated with the randomized clock drift vector, and t denotes a current time.

13. A computer program product comprising a non-transitory processor-readable storage medium having embodied therein one or more software programs for authenticating a first cryptographic device, wherein the one or more software programs when executed by a processor of a second cryptographic device cause the processor:
- to store in the second cryptographic device an alternative version of a secret value associated with the first cryptographic device in place of the secret value itself as a countermeasure to compromise of the secret value;
- in conjunction with a protocol carried out between the first cryptographic device and the second cryptographic device, to determine in the second cryptographic device the secret value based at least in part on the alternative version of the secret value; and
- to authenticate the first cryptographic device utilizing the determined secret value in the second cryptographic device;
- wherein the first cryptographic device comprises a time-synchronous authentication token and the second cryptographic device comprises an authentication server;
- wherein the secret value comprises a randomized clock drift vector of the time-synchronous authentication token;
- wherein the randomized clock drift vector is randomized by selection of said clock drift vector from a range between a minimum clock drift vector and a maximum clock drift vector; and wherein the alternative version of the secret value comprising the randomized clock drift vector comprises information specifying the minimum clock drift vector and the maximum clock drift vector.

14. An apparatus for use in authenticating a first cryptographic device, comprising:
- a second cryptographic device comprising a processor coupled to a memory;
- the second cryptographic device configured to authenticate the first cryptographic device under control of said processor;
- wherein the second cryptographic device is further configured to store in said memory an alternative version of a secret value associated with the first cryptographic device in place of the secret value itself as a countermeasure to compromise of the secret value; and
- wherein in conjunction with a protocol carried out between the first cryptographic device and the second cryptographic device, the second cryptographic device determines the secret value based at least in part on the alternative version of the secret value and utilizes the determined secret value to authenticate the first cryptographic device;
- wherein the first cryptographic device comprises a time-synchronous authentication token and the second cryptographic device comprises an authentication server;
- wherein the secret value comprises a randomized clock drift vector of the time-synchronous authentication token;
- wherein the randomized clock drift vector is randomized by selection of said clock drift vector from a range between a minimum clock drift vector and a maximum clock drift vector; and wherein the alternative version of the secret value comprising the randomized clock drift vector comprises information specifying the minimum clock drift vector and the maximum clock drift vector.

15. The apparatus of claim 14 wherein a record file of the authentication server stores the alternative version of the secret value rather than the secret value itself even after the secret value is determined in conjunction with the protocol.

16. The apparatus of claim 14 wherein the secret value comprises a key of the first cryptographic device and the alternative version of the secret value comprises a randomly-skewed version of the key.

17. The apparatus of claim 14 wherein the secret value comprises a randomized parameter of the first cryptographic device and the alternative version of the secret value comprises information characterizing a range of values from which said randomized parameter was selected.

18. The apparatus of claim 14 wherein determining the secret value comprises determining the randomized clock drift vector by matching a presented passcode to a list of potential passcodes within a time window determined as a function of the minimum and maximum clock drift vectors.

19. The apparatus of claim 14 wherein the secret value comprises both a randomized initialization time and the randomized clock drift vector of the time-synchronous authentication token, and wherein the authentication server determines corresponding random skew values for the randomized initialization time and the randomized clock drift vector by obtaining at least two interpolation points of a linear function given generally as follows:

$$S_{IT}+t\cdot(S_{CD})$$

where $S_{IT}$ denotes the random skew value associated with the randomized initialization time, $S_{CD}$ denotes the random skew value associated with the randomized clock drift vector, and t denotes a current time.

20. An apparatus comprising:
- a first cryptographic device comprising a processor coupled to a memory;
- the first cryptographic device having an associated secret value and configured to authenticate to a second cryptographic device;
- wherein the second cryptographic device is configured to store an alternative version of the secret value associated with the first cryptographic device in place of the secret value itself as a countermeasure to compromise of the secret value;
- wherein in conjunction with a protocol carried out between the first cryptographic device and the second cryptographic device, the second cryptographic device determines the secret value based at least in part on the alternative version of the secret value and utilizes the determined secret value to authenticate the first cryptographic device;
- wherein the first cryptographic device comprises a time-synchronous authentication token and the second cryptographic device comprises an authentication server;
- wherein the secret value comprises a randomized clock drift vector of the time-synchronous authentication token;
- wherein the randomized clock drift vector is randomized by selection of said clock drift vector from a range between a minimum clock drift vector and a maximum clock drift vector; and wherein the alternative version of the secret value comprising the randomized clock drift vector comprises information specifying the minimum clock drift vector and the maximum clock drift vector.

21. The apparatus of claim 20 wherein determining the secret value comprises determining the randomized clock drift vector by matching a presented passcode to a list of potential passcodes within a time window determined as a function of the minimum and maximum clock drift vectors.

22. The apparatus of claim 20 wherein the secret value comprises both a randomized initialization time and the randomized clock drift vector of the time-synchronous authentication token, and wherein the authentication server determines corresponding random skew values for the randomized initialization time and the randomized clock drift vector by obtaining at least two interpolation points of a linear function given generally as follows:

$$S_{IT} + t \cdot (S_{CD})$$

where $S_{IT}$ denotes the random skew value associated with the randomized initialization time, $S_{CD}$ denotes the random skew value associated with the randomized clock drift vector, and t denotes a current time.

* * * * *